(12) United States Patent
Lius et al.

(10) Patent No.: US 12,159,000 B2
(45) Date of Patent: *Dec. 3, 2024

(54) ELECTRONIC DEVICE TO RECEIVE FINGERPRINT DATA

(71) Applicant: InnoLux Corporation, Miao-Li County (TW)

(72) Inventors: Chandra Lius, Miao-Li County (TW); Kuan-Feng Lee, Miao-Li County (TW)

(73) Assignee: INNOLUX CORPORATION, Miao-Li County (TW)

( * ) Notice: Subject to any disclaimer, the term of this patent is extended or adjusted under 35 U.S.C. 154(b) by 0 days.

This patent is subject to a terminal disclaimer.

(21) Appl. No.: 18/347,275

(22) Filed: Jul. 5, 2023

(65) Prior Publication Data

US 2023/0341966 A1    Oct. 26, 2023

Related U.S. Application Data

(63) Continuation of application No. 17/743,682, filed on May 13, 2022, now Pat. No. 11,733,794, which is a
(Continued)

(51) Int. Cl.
*G06V 40/13* (2022.01)
*G06F 3/041* (2006.01)
(Continued)

(52) U.S. Cl.
CPC ............ *G06F 3/0412* (2013.01); *G06F 3/041* (2013.01); *G06V 10/141* (2022.01);
(Continued)

(58) Field of Classification Search
None
See application file for complete search history.

(56) References Cited

U.S. PATENT DOCUMENTS 10,679,031 B2  6/2020  Peng
10,990,783 B2  4/2021  Yang
(Continued)

FOREIGN PATENT DOCUMENTS

CN    104978559 A    10/2015
CN    107168469 A    9/2017
(Continued)

OTHER PUBLICATIONS

Extended European Search Report dated Feb. 8, 2024, issued in application No. EP 23205906.3.
(Continued)

*Primary Examiner* — Joseph R Haley
(74) *Attorney, Agent, or Firm* — McClure, Qualey & Rodack, LLP

(57) ABSTRACT

An electronic device includes a substrate, a lighting unit, first and second units. The lighting unit includes a plurality of lighting pixels, and has a first region. The first unit receives a first signal, includes a plurality of first pixels, and has a second region overlapped the first region. The second unit receives a second signal different from the first signal, includes a plurality of second pixels, and has a third region overlapped with the second region. A density of a part of the plurality of the first pixels in the second region is less than a density of a part of the plurality of the second pixels in the third region, and a density of a part of the plurality of lighting pixels in the first region is less than the density of the part of the plurality of second pixels in the third region.

10 Claims, 16 Drawing Sheets

Related U.S. Application Data continuation of application No. 17/113,664, filed on Dec. 7, 2020, now Pat. No. 11,361,582, which is a continuation of application No. 16/364,387, filed on Mar. 26, 2019, now Pat. No. 10,885,302.

(51) Int. Cl.
  *G06V 10/141* (2022.01)
  *G06V 40/12* (2022.01)
  *G09G 3/20* (2006.01)

(52) U.S. Cl.
  CPC ...... *G06V 40/1318* (2022.01); *G06V 40/1365* (2022.01); *G09G 3/2003* (2013.01); *G09G 2320/0666* (2013.01); *G09G 2354/00* (2013.01)

(56) References Cited

U.S. PATENT DOCUMENTS

| | | |
|---|---|---|
| 11,048,905 B2 | 6/2021 | Zhang |
| 2015/0177884 A1 | 6/2015 | Han |
| 2017/0220182 A1 | 8/2017 | Schwartz |
| 2018/0276445 A1 | 9/2018 | Wu |
| 2018/0307884 A1* | 10/2018 | Xu .......................... H10K 59/40 |
| 2019/0042017 A1* | 2/2019 | Lu ...................... G06V 40/1376 |

FOREIGN PATENT DOCUMENTS

| | | |
|---|---|---|
| CN | 107256068 A | 10/2017 |
| CN | 107657238 A | 2/2018 |
| WO | 2019/007514 A1 | 1/2019 |

OTHER PUBLICATIONS

Chinese language office action dated Jun. 24, 2024, issued in application No. CN 202010138832.5.

Chinese language office action dated Aug. 29, 2024, issued in application No. CN 202010138832.5.

\* cited by examiner

ELECTRONIC DEVICE TO RECEIVE FINGERPRINT DATA

CROSS REFERENCE TO RELATED APPLICATIONS

This application is a Continuation of pending U.S. patent application Ser. No. 17/743,682, filed May 13, 2022 and entitled "ELECTRONIC DEVICE TO RECEIVE FINGERPRINT DATA AND METHOD FOR THE SAME" (now U.S. Pat. No. 11,733,794), which is a Continuation of pending prior application Ser. No. 17/113,664, filed Dec. 7, 2020 (now U.S. Pat. No. 11,361,582) and entitled "METHOD FOR AN ELECTRONIC DEVICE TO RECEIVE FINGERPRINT DATA", which is a Continuation of Ser. No. 16/364,387, filed Mar. 26, 2019 (now U.S. Pat. No. 10,885,302) and entitled "METHOD FOR AN ELECTRONIC DEVICE TO RECEIVE FINGERPRINT DATA", the entirety of which is incorporated by reference herein.

BACKGROUND

Technical Field

The present disclosure relates to a method for an electronic device to receive fingerprint data, and in particular to a method used in the fingerprint authentication process.

Description of the Related Art

Fingerprint authentication has been widely used in electronic devices like smartphones. However, the accuracy and sensitivity performance of the fingerprint authentication of the electronic device needs to be improved.

SUMMARY

In accordance with some embodiments of the present disclosure, an electronic device is provided. The electronic device includes a lighting unit, a first unit, and a second unit. The lighting unit includes a plurality of lighting sub-units, wherein the lighting unit has a first region. The first unit receives a first signal and includes a plurality of first sub-units, wherein the first unit has a second region overlapped the first region. The second unit receives a second signal different from the first signal and includes a plurality of second sub-units, wherein the second unit has a third region overlapped with the second region and the lighting unit is disposed between the first unit and the second unit. A density of a part of the plurality of the first sub-units in the second region is less than a density of a part of the plurality of the second sub-units in the third region, and a density of a part of the plurality of lighting sub-units in the first region is less than the density of the part of the plurality of second sub-units in the third region.

A detailed description is given in the following embodiments with reference to the accompanying drawings.

BRIEF DESCRIPTION OF THE DRAWINGS

The disclosure may be understood by reading the subsequent detailed description and examples with references made to the accompanying drawings, wherein.

DETAILED DESCRIPTION

Figure 1:
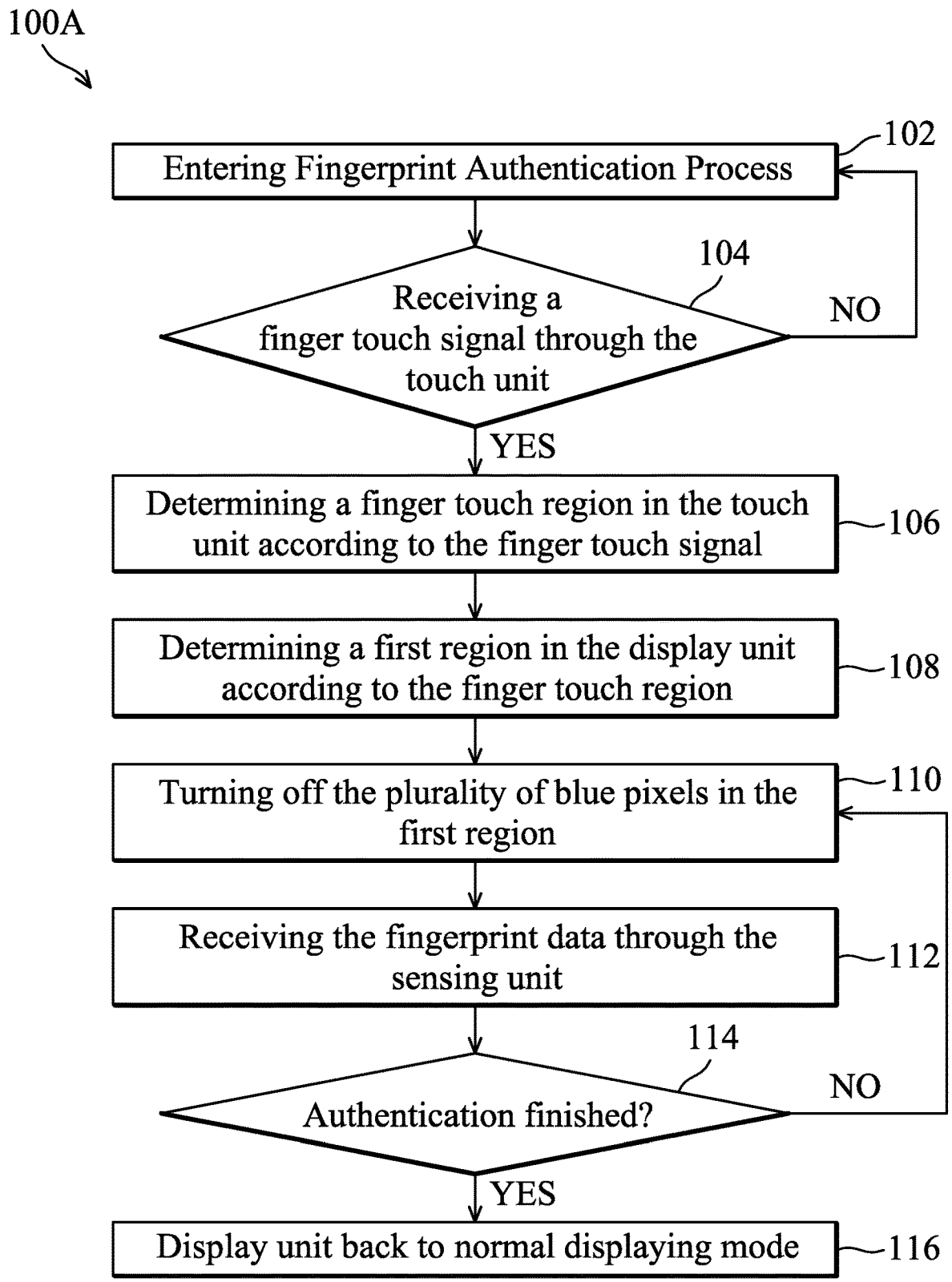
FIG. 1 illustrates a flow chart for an electronic device to receive fingerprint data in accordance with some embodiments of the present disclosure.

The electronic devices of the present disclosure are described in detail in the following description. In the following detailed description, for purposes of explanation, numerous specific details and embodiments are set forth in order to provide a thorough understanding of the present disclosure. It will be apparent, however, that the exemplary embodiments set forth herein are used merely for the purpose of illustration, and the inventive concept may be embodied in various forms without being limited to those exemplary embodiments. In addition, the drawings of different embodiments may use like and/or corresponding numerals to denote like and/or corresponding elements. However, the use of like and/or corresponding numerals in the drawings of different embodiments does not suggest any correlation between different embodiments. In addition, in this specification, expressions such as "first material layer disposed above/on/over a second material layer", may indicate the direct contact of the first material layer and the second material layer, or it may indicate a non-contact state with one or more intermediate layers between the first material layer and the second material layer. In the above situation, the first material layer may not be in direct contact with the second material layer.

In addition, in this specification, relative expressions are used. For example, "upper" or "lower" is used to describe the position of one element relative to another. It should be appreciated that if a device is flipped upside down, an element that is on the "bottom" will become an element that is on the "top".

It should be understood that, although the terms first, second, third etc. may be used herein to describe various elements, components, regions, layers, portions and/or sections, these elements, components, regions, layers, portions and/or sections should not be limited by these terms. These terms are only used to distinguish one element, component, region, layer, portion or section from another element, component, region, layer or section. Thus, a first element, component, region, layer, portion or section discussed below could be termed a second element, component, region, layer, portion or section without departing from the teachings of the present disclosure.

It should be understood that this description of the exemplary embodiments is intended to be read in connection with the accompanying drawings, which are to be considered part of the entire written description. The drawings are not drawn to scale. In addition, structures and devices are shown schematically in order to simplify the drawing. In the drawings, some components may be omitted for clarity. Moreover, some components in the drawings may be eliminated as another embodiment of the present disclosure.

The terms "about" and "substantially" typically mean +/−20% of the stated value, more typically +/−10% of the stated value, more typically +/−5% of the stated value, more typically +/−3% of the stated value, more typically +/−2% of the stated value, more typically +/−1% of the stated value and even more typically +/−0.5% of the stated value. The stated value of the present disclosure is an approximate value. When there is no specific description, the stated value includes the meaning of "about" or "substantially". Moreover, when considering the deviation or the fluctuation of the manufacturing process, the term "same" may also include the meaning of "about" or "substantially".

Unless defined otherwise, all technical and scientific terms used herein have the same meaning as commonly understood by one of ordinary skill in the art to which this disclosure belongs. It should be appreciated that, in each case, the term, which is defined in a commonly used dictionary, should be interpreted as having a meaning that conforms to the relative skills of the present disclosure and the background or the context of the present disclosure, and should not be interpreted in an idealized or overly formal manner unless so defined.

In addition, in some embodiments of the present disclosure, terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise.

The term "substrate" may include elements and films that are already formed on the substrate, and may include a plurality of active elements, such as transistors. For brevity, it is illustrated in a plate substrate.

In addition, the phrase "in a range from a first value to a second value" indicates the range includes the first value, the second value, and other values in between.

Figure 2:
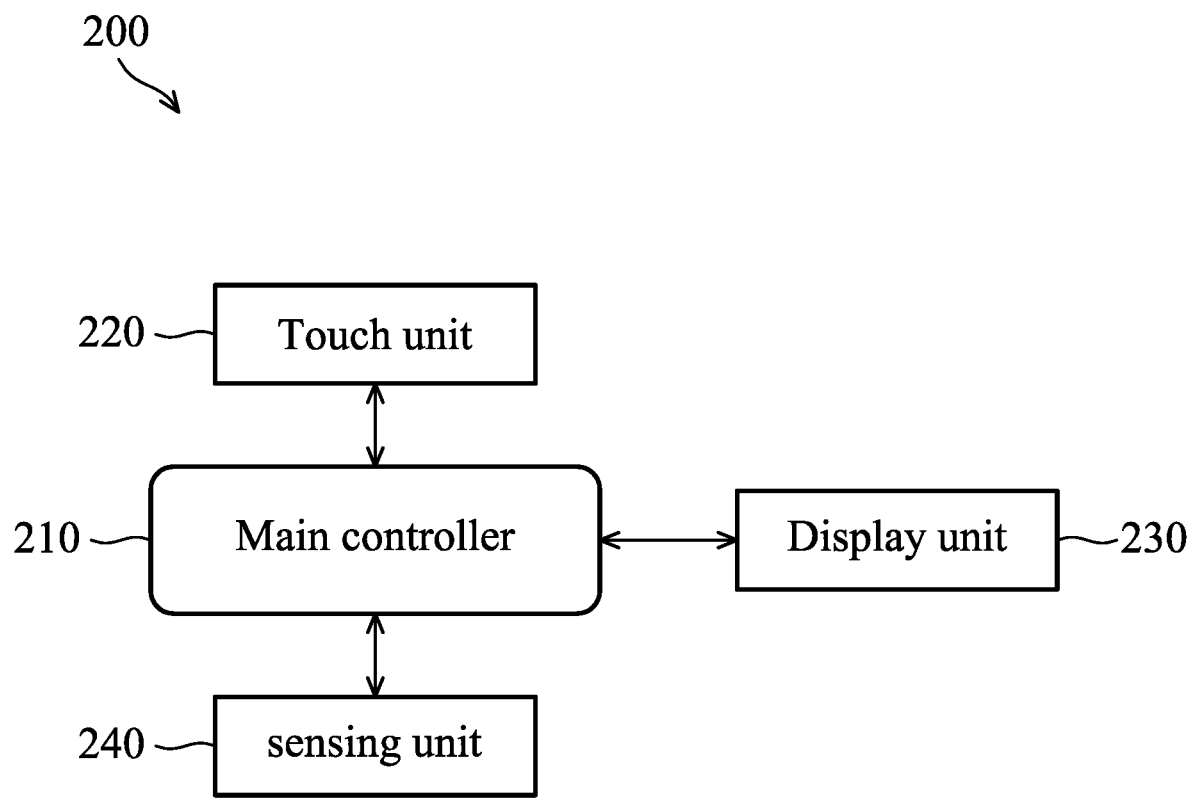
FIG. 2 illustrates function blocks included in an electronic device in accordance with some embodiments of the present disclosure.

Refer to FIG. 1, which illustrates a flow chart of a method 100A for an electronic device 200 to receive fingerprint data in accordance with some embodiments of the present disclosure. In addition, as shown in FIG. 2, the electronic device 200 may include a main controller 210, a touch unit 220, a display unit 230 and a sensing unit 240. The main controller 210 may include, but is not limited to, an integrated circuit (IC) or a central processing Unit (CPU). During the fingerprint authentication process, the main controller 210 may compute received signal from the touch unit 220, the display unit 230 and sensing unit 240, and output the computed signal to them, respectively.

Figure 3A:
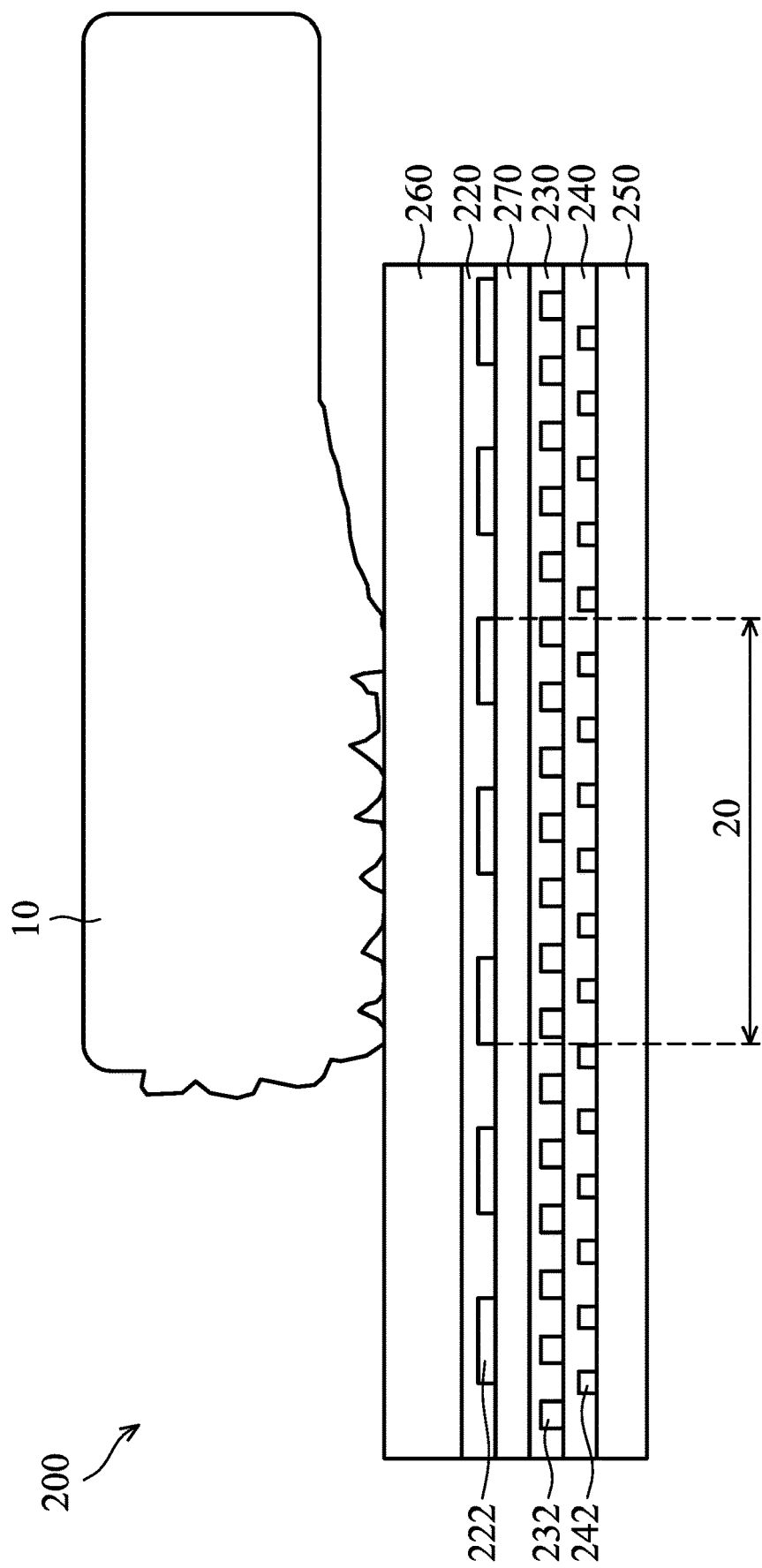
FIGS. 3A-3D illustrate cross-sectional views of various stages of a process for an electronic device to receive fingerprint data in accordance with some embodiments of the present disclosure.

The method 100A begins by entering the fingerprint authentication process in step 102. Next, the method 100A includes the step 104, receiving a finger touch signal through the touch unit, followed by the step 106, determining a finger touch region in the touch unit according to the finger touch signal. Refer to FIG. 3A, which illustrates a cross-sectional view of an electronic device 200, and may correspond to the step 104 and the step 106.

As shown in FIG. 3A, the electronic device 200 may include a substrate 250. The substrate 250 may include a glass substrate, a ceramic substrate, a polymer substrate or other suitable substrates. In addition, the substrate 250 may include a plurality of active elements and passive elements disposed thereon.

The electronic device 200 includes the sensing unit 240 and the display unit 230 that are disposed on the substrate 250. The positions of the sensing unit 240 and the display unit 230 may be exchanged. In addition, FIG. 3A illustrates that the sensing unit 240 and the display unit 230 are located in different layers. For example, the sensing unit 240 may be disposed on the display unit 230. However, the scope of the disclosure is not intended to be limited. The display unit 230 may include a plurality of display pixels 232. The display pixel 232 may include, but is not limited to, a plurality of blue pixels, red pixels, green pixels and/or infrared pixels. The display pixel 232 may include light-emitting diodes (LED) or organic light-emitting diodes (OLED), which may emit light with different ranges of wavelength. In some examples, the light-emitting diodes may include a mini light-emitting diode and/or a micro light-emitting diode. However, the scope of the disclosure is not intended to be limited. The sensing unit 240 may include a plurality of sensing pixel 242. The sensing pixel 242 may include, but is not limited to, a PIN diode, which includes two semiconductor layers and one undoped intrinsic semiconductor region disposed between them. In some embodiment, the sensing unit 240 may be used to receive the signal of light reflected from the finger 10. In some embodiments, the sensing pixel 242 and the display pixels 232 may be disposed in the same layer.

The electronic device 200 may include an intermediate layer 270 between the touch unit 220 and the display unit 230. The intermediate layer 270 may include elements according to the requirement of the electronic device 200. For example, the intermediate layer 270 may include, but is not limited to, a liquid crystal layer, polyimide layers, a common electrode, a pixel electrode, an encapsulating layer for the display unit 230 or other suitable elements. The touch unit 220 may be disposed on the intermediate layer 270. The touch unit 220 may include a plurality of touch pixels 222. It should be appreciated that the sizes of the touch pixel 222, the display pixel 232 and the sensing pixel 242 are merely exemplars, and is not limited thereto. In some embodiment, one touch pixel 222 may cover hundreds or thousands of the display pixels 232 and/or the sensing pixels 242.

In addition, the electronic device 200 may further include a cover layer 260 disposed on the touch unit 220. The cover layer 260 may be used as a layer on which the finger 10 touches. The material of the touch unit 220 may include, but is not limited to, metal, metal oxide, other suitable materials, or a combination thereof.

As shown in FIG. 3A, when a finger 10 touches the electronic device 200, the electronic device 200 may receive a finger touch signal through the touch unit 220. If the electronic device 200 fails to receive the finger touch signal, the step of the method 100A will come back to the step 102, entering the fingerprint authentication process. After the electronic device 200 receives the finger touch signal, the main controller 210 will process the finger touch signal and determine a finger touch region 20 in the touch unit 220 as shown in FIG. 3A.

Figure 3B:
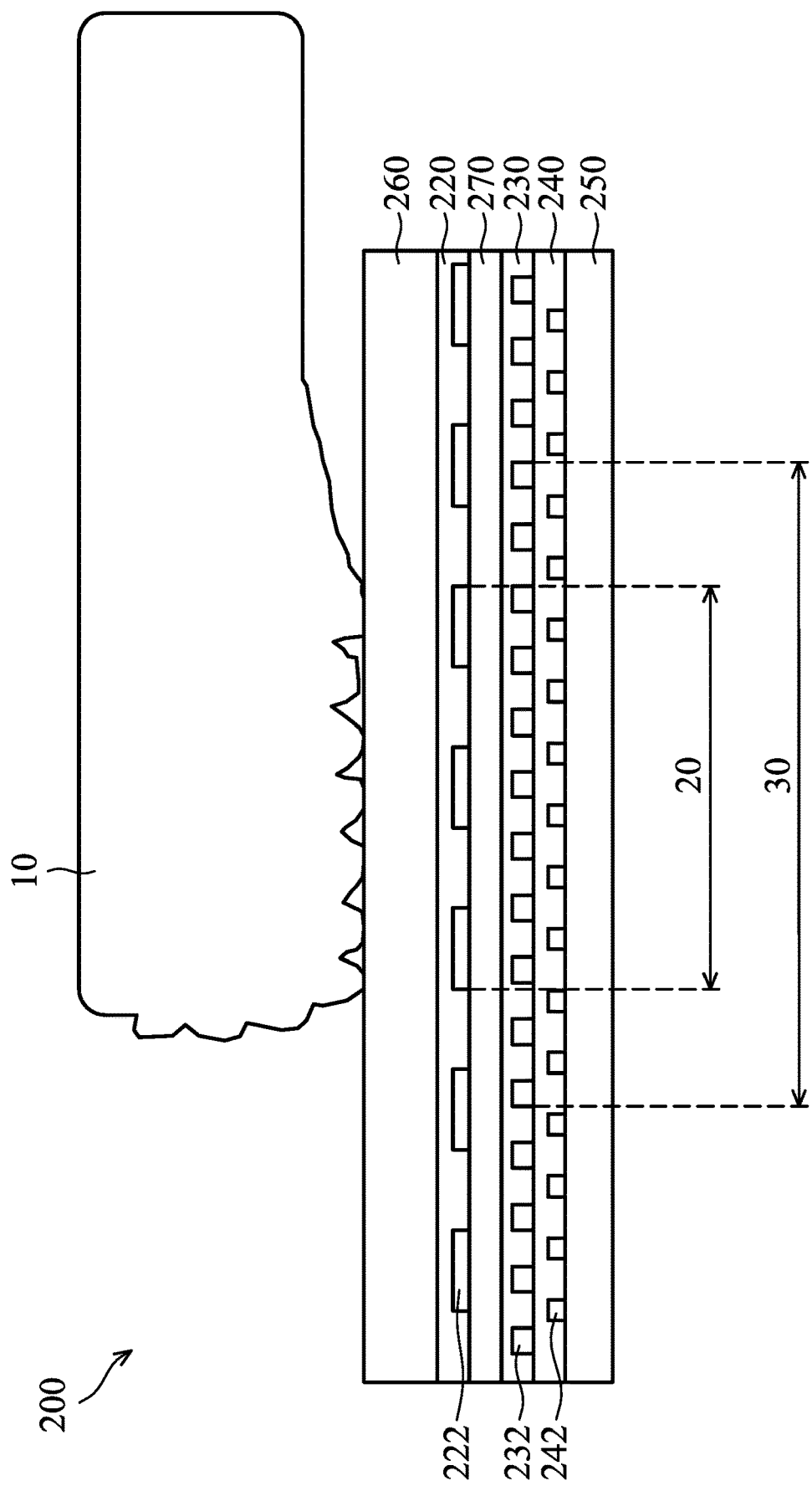

Next, the step 108, determining a first region in the display unit according to the finger touch region, is performed. After the finger touch region 20 is determined, the main controller 210 will define a first region 30 within the display unit 230 according to the finger touch region 20 as shown in FIG. 3B. How to define the finger touch region 20 and the first region 30 will be discussed in detail below. In some embodiments, the area of the first region may be greater than or equal to the area of the finger touch region 20.

Figure 3D:
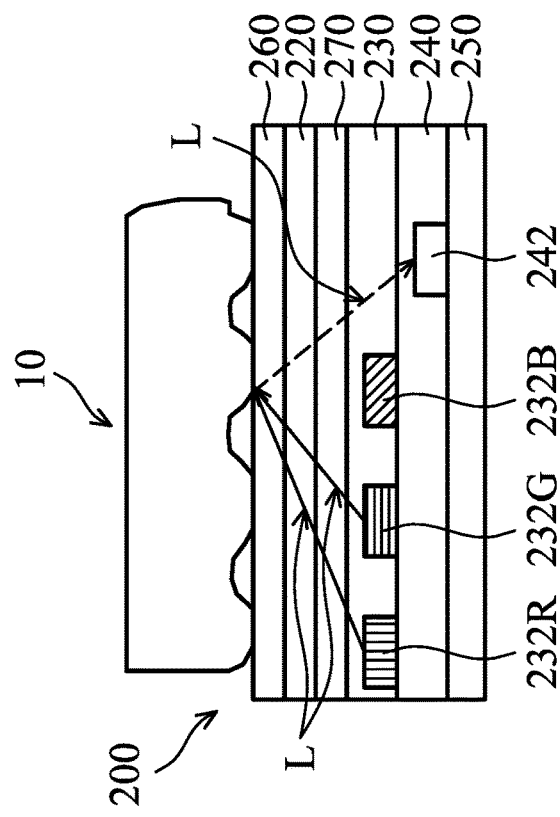
Figure 3C:
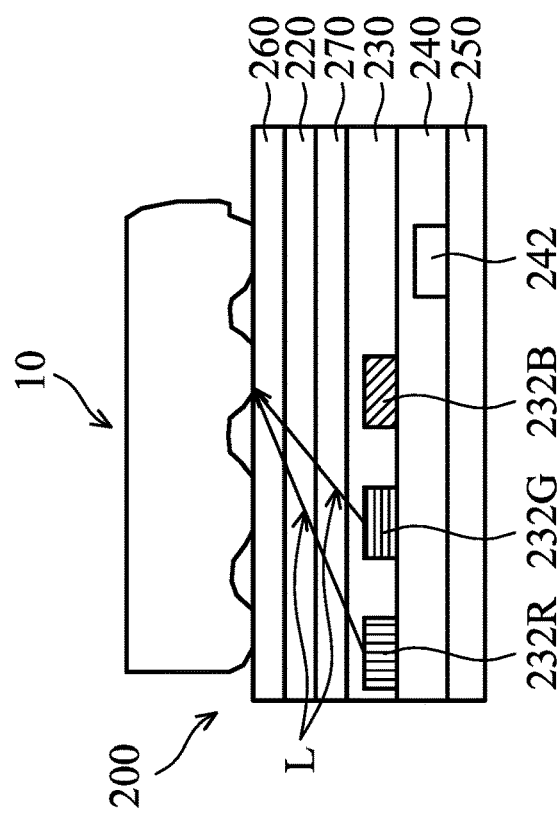

Next, the step 110, turning off the plurality of blue pixels in the first region, is performed. Refer to FIG. 3C, which illustrates the status of different pixels in the step 110. It should be appreciated that for better being understood, some elements are omitted and/or simplified in FIG. 3C. In some embodiments, when the display pixels 232 of the display unit 230 may include a plurality of red pixels 232R, green pixels 232G and blue pixels 232B, at least one of the blue pixels 232B in the first region 30 are turned off in the step 110. Moreover, at least one of the red pixels 232R and/or the green pixels 232G in the first region 30 emits light L. In this embodiment, the blue, red and green pixels out of the first region 30 may be turned on and/or turned off, and the scope of the disclosure is not intended to be limited.

Next, the step 112, receiving the fingerprint data through the sensing unit, is performed. As shown in FIG. 3D, after the light L is emitted, the light L may be incident to the finger 10 and then reflected into the sensing pixel 242, and the sensing pixel 242 would receive the fingerprint data. The fingerprint data received by the sensing pixel 242 will be used for identity authentication.

In some embodiments, due to lower transmission speed and higher scattering ability of the blue light in the dielectric layer, the blue light causes lower signal-to-noise ratio in the step of receiving the fingerprint data of the sensor unit. In the embodiments where the blue pixels in the first region are turned off during receiving the fingerprint data of the sensor unit, the signal-to-noise ratio could be improved. In some embodiments, the area of the first region is greater than or equal to that of the finger touch region, so more pixels, such as the red pixels and/or the green pixels, could provide more light for enhancing the signal.

Next, the step 114, checking whether the fingerprint authentication is finished or not, is performed. If the fingerprint authentication is finished, the step 116 will be performed. If not, the step of the method 100A will come back to the step 110, turning off the plurality of blue pixels in the first region. In other words, as long as the finger 10 touches the electronic devices 200, the step 112, receiving the fingerprint data, may be repeated till the authentication is finished. In the step 116, after the fingerprint authentication is finished, the display unit 230 will come back to normal displaying mode.

In some embodiments, before the step 102, entering the fingerprint authentication process, the display unit 230 may operate to display, but it is not limited thereto. The plurality of the display pixels 232 of the display unit 230 may be receiving commands and driven to display an image. In other words, the plurality of the display pixels 232 of the display unit 230 in the first region 30, prior to entering the fingerprint authentication process, may be in on-state and be driven to achieve the image as commanded by the main controller 210. For an example, prior to entering the fingerprint authentication process, the display pixels 232 may be commanded to display a cyan-colored object, hence, only the green pixels and the blue pixels are driven at high luminance, while the red pixel are driven at low luminance.

In other embodiments, the blue pixels in the first region 30 may be off-state before the step 102. The blue pixels may keep in the off-state. In another embodiment, the red and green pixels in the first region 30 may be off-state before the step 102, the red pixels and/or the green pixels in the first region 30 may be turned on for the fingerprint authentication process, such as in the step 108 or the step 110, but it is not limited thereto.

Figure 4A:
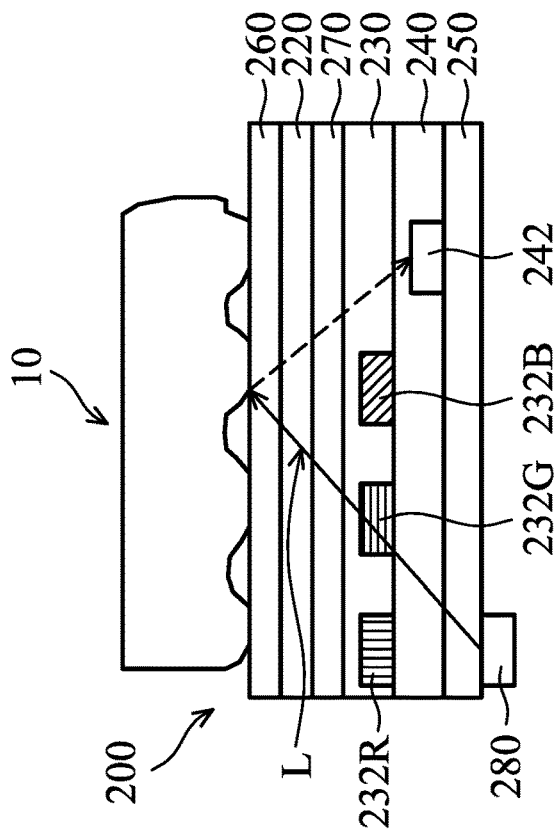
FIGS. 4A-4C illustrate cross-sectional views of electronic devices in accordance with some embodiments of the present disclosure.
Figure 4B:
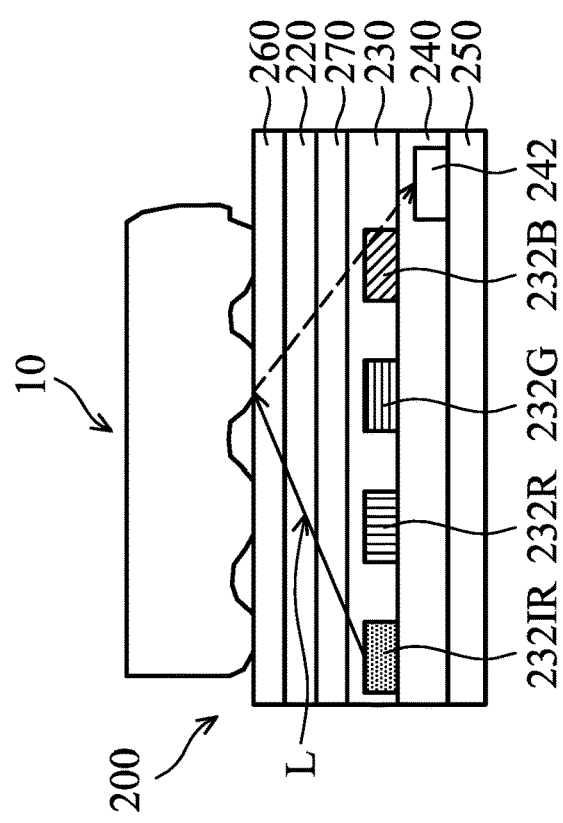
Figure 4C:
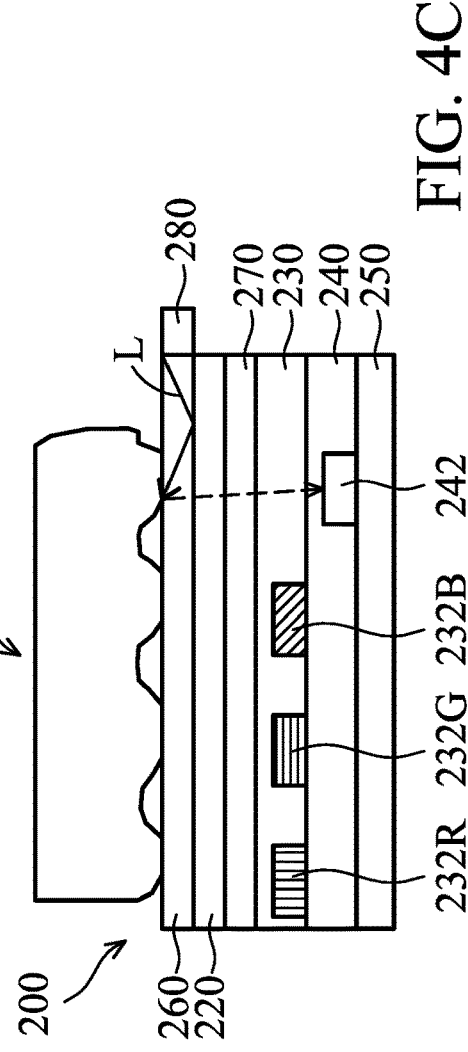

Many variations and/or modifications can be made to embodiments of the disclosure. Refer to FIGS. 4A-4C, which illustrate cross-sectional views of the electronic device 200 in accordance with some embodiments of the present disclosure. It should be appreciated that for better being understood, some elements are omitted and/or simplified in FIGS. 4A-4C.

In some embodiments, the electronic device 200 may include a plurality of infrared pixels 232IR as shown in FIG. 4A. In this embodiment, the infrared pixels 232IR are turned on and the blue pixels 232B are turned off in the first region 30 when the step 110 is performed. In some embodiments, the infrared pixels 232IR may be disposed in at least a portion of the display unit 230. For example, there may be no infrared pixel 232IR in some portions of the display unit 230. In addition, in this embodiment, at least one of the red pixels 232R and the green pixels 232G in the first region 30 may be turned on and/or turned off, and the IR, blue, red and green pixels out of the first region 30 may be turned on and/or turned off, and the scope of the disclosure is not intended to be limited.

In some embodiments, the electronic device 200 may include an infrared light source 280 as shown in FIG. 4B. The infrared light source 280 may be disposed under the substrate 250. For example, the infrared light source 280 may be disposed on a surface of the substrate 250 away from the display unit 230. The infrared light source 280 may be, but is not limited to, a light-emitting diode that emits infrared light. In this embodiment, the infrared light source 280 is turned on, and the blue pixels 232B in the first region 30 are turned off when the step 110 is performed.

In some embodiments, the infrared light source 280 may be disposed on a side surface of the cover layer 260 as shown in FIG. 4C. In this embodiment, the infrared light source 280 is turned on and the blue pixels 232B in the first region 30 are turned off when the step 110 is performed.

Figure 5:
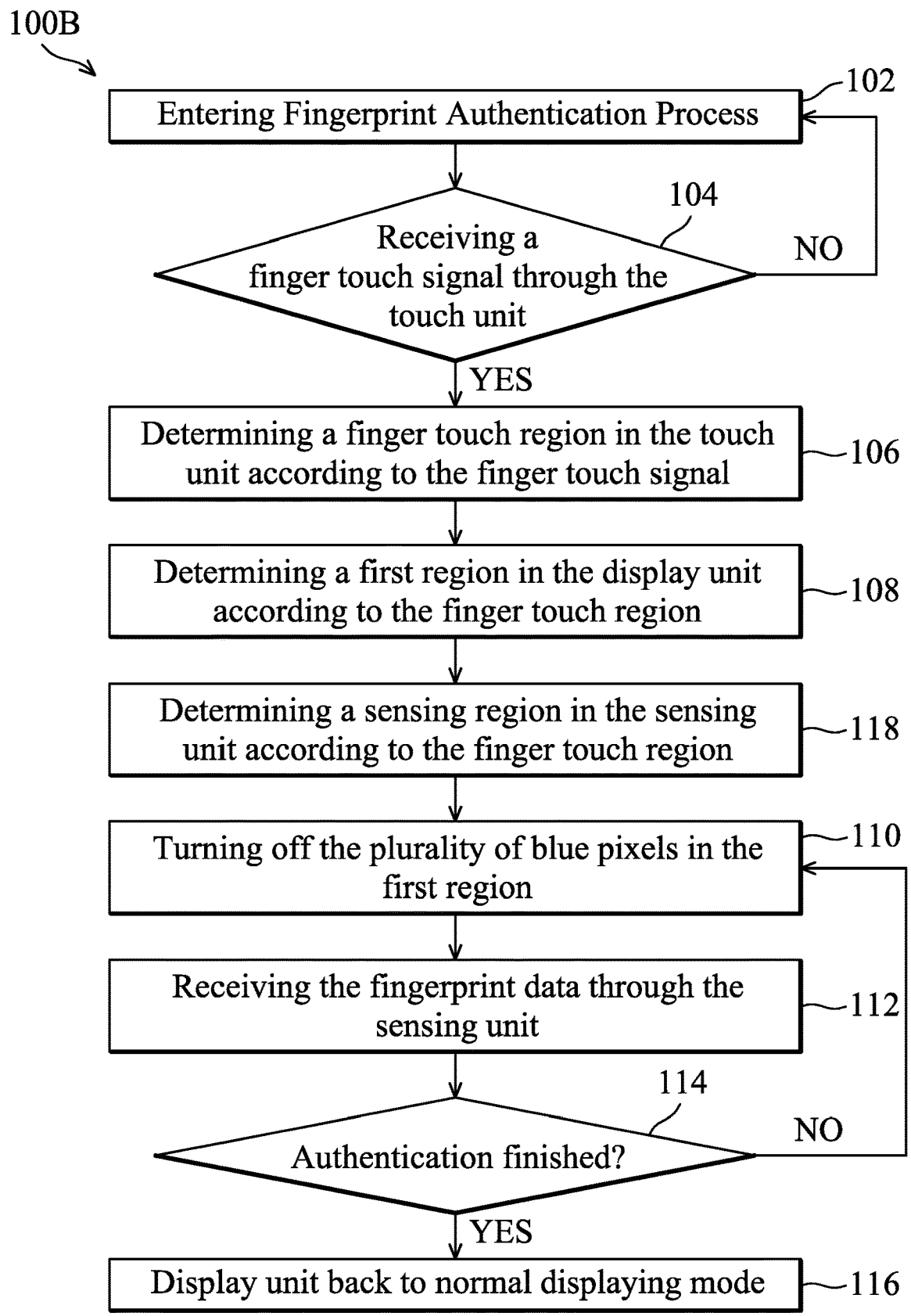
FIG. 5 illustrates a flow chart for an electronic device to receive fingerprint data in accordance with some embodiments of the present disclosure.

Refer to FIG. 5, which illustrates a flow chart of a method 100B for the electronic device 200 to receive fingerprint data in accordance with some embodiments of the present disclosure. In some embodiments, one of the differences between the method 100A and the method 100B is that the method 100B further includes the step 118, determining a sensing region in the sensing unit according to the finger touch region. The step 118 may be performed after determining the first region 30 in the display unit 230. In some embodiments, the step 118 may be performed after turning off the blue pixels 232B in the first region 30.

Figure 6:
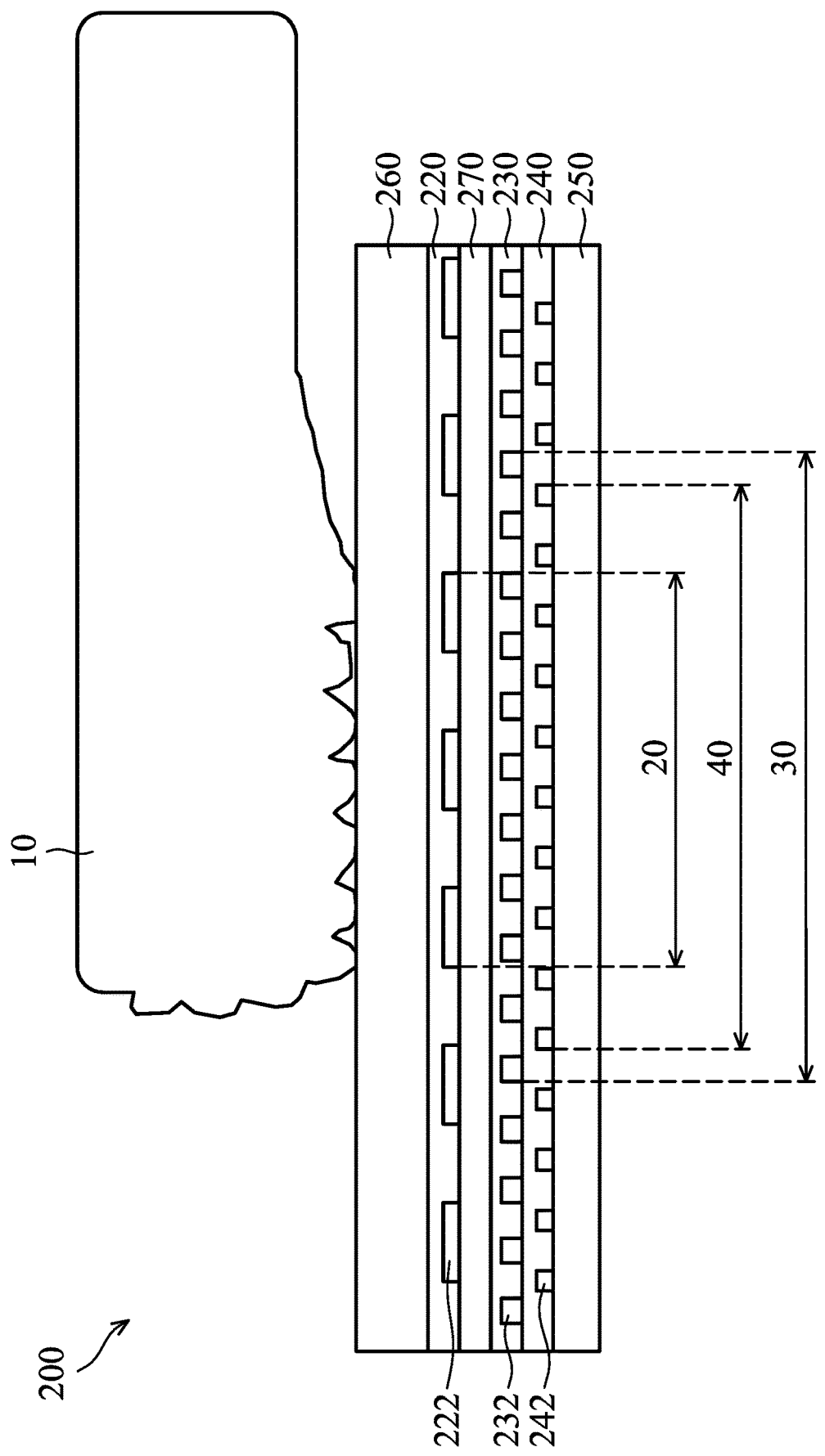
FIG. 6 illustrates a cross-sectional view of one of the stages for an electronic device to receive fingerprint data in accordance with some embodiments of the present disclosure.

Refer to FIG. 6, which corresponds to step 118. After the finger touch region 20 is determined, the main controller 210 will define a sensing region 40 in the sensing unit 240 according to the finger touch region 20. After the sensing region 40 is determined, the sensing pixels 242 in the sensing region 40 will be turned on. The sensing pixels 242 that are turned on can receive the fingerprint data, while the sensing pixels 242 not turned on cannot.

Figure 7:
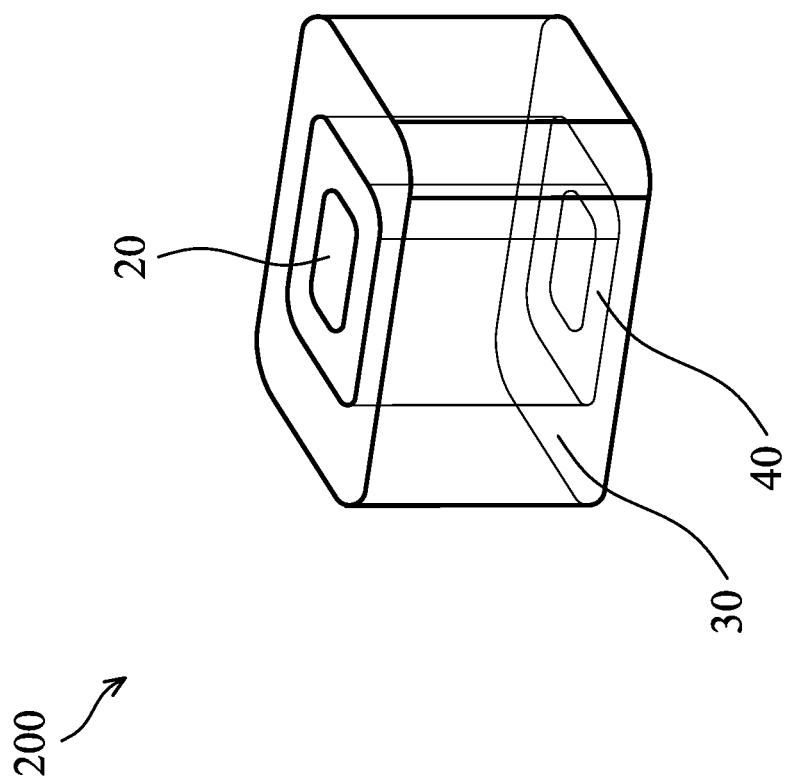
FIG. 7 illustrates a three-dimensional view of the electronic device in accordance with some embodiments of the present disclosure.

Refer to FIG. 7, which illustrates a three-dimensional view of the electronic device 200 in the step of determining a sensing region 40 in accordance with some embodiments of the present disclosure. In some embodiments, the area of the first region 30 may be greater than or equal to the area of the sensing region 40. In some embodiments, the area of the sensing region 40 may be greater than or equal to the area of the finger touch region 20. When light emitted from the display pixels 232 is incident to the finger 10, the light may be reflected back into the sensing pixel 242 in and out of the finger touch region 20. Therefore, when the sensing region 40 is greater than or equal to the area of the finger touch region 20, it may assist in improving the sensitivity of receiving the fingerprint data. Furthermore, when the sensing region 40 is greater than or equal to the area of the finger touch region 20, the acquired fingerprint data may include larger area of fingerprint, which may provide more features to be authenticated. In other word, the security of the fingerprint sensor will be improved.

Figure 8:
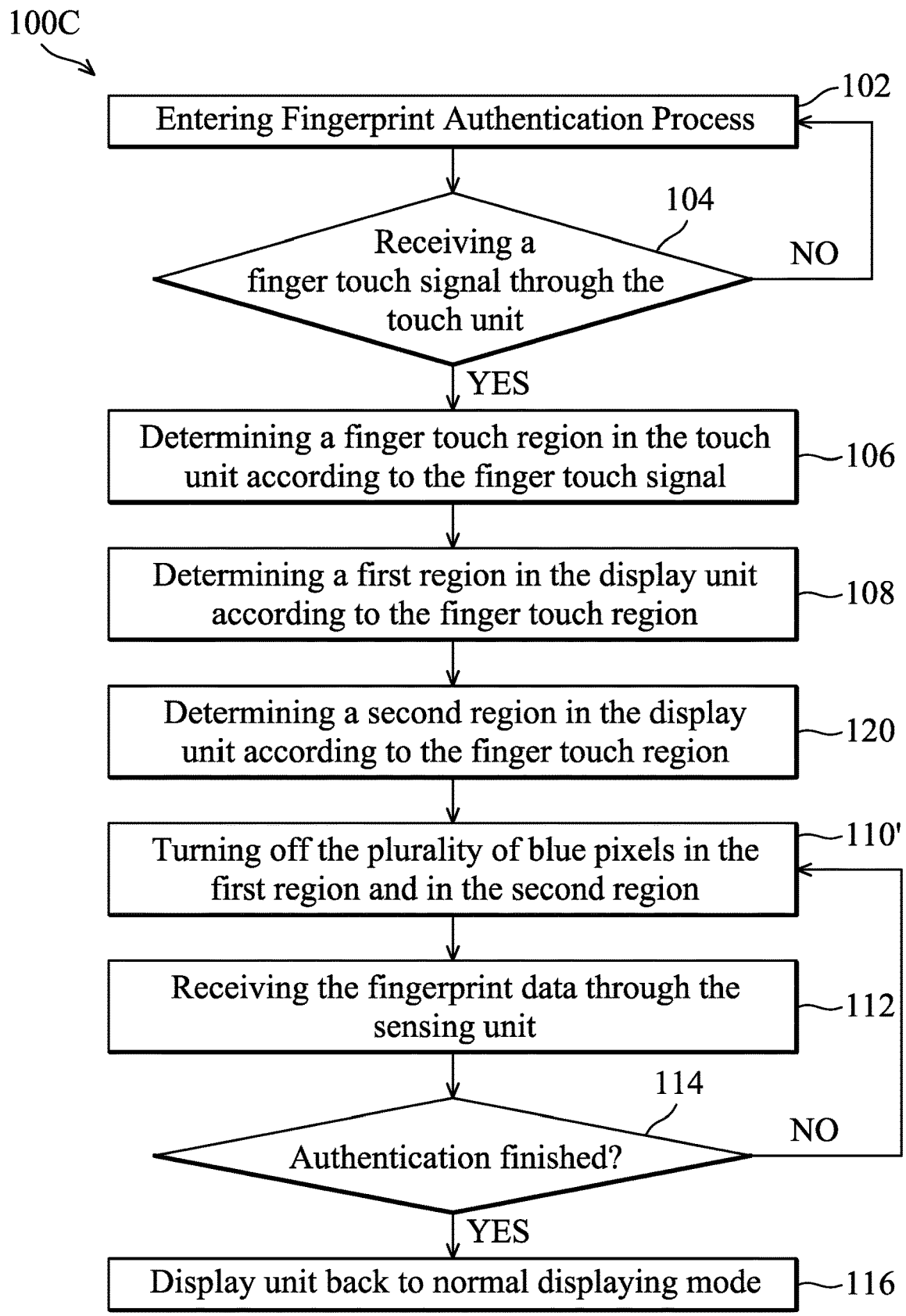
FIG. 8 illustrates a flow chart for an electronic device to receive fingerprint data in accordance with some embodiments of the present disclosure.

Refer to FIG. 8, which illustrates a flow chart of a method 100C for the electronic device 200 to receive fingerprint data in accordance with some embodiments of the present disclosure. In some embodiments, one of the differences between the method 100A and the method 100C is that the method 100C further includes the step 120, determining a second region in the display unit according to the finger touch region. Step 120 may be performed after determining the first region 30 in the display unit 230 and before turning off the blue pixels 232B.

Figure 9:
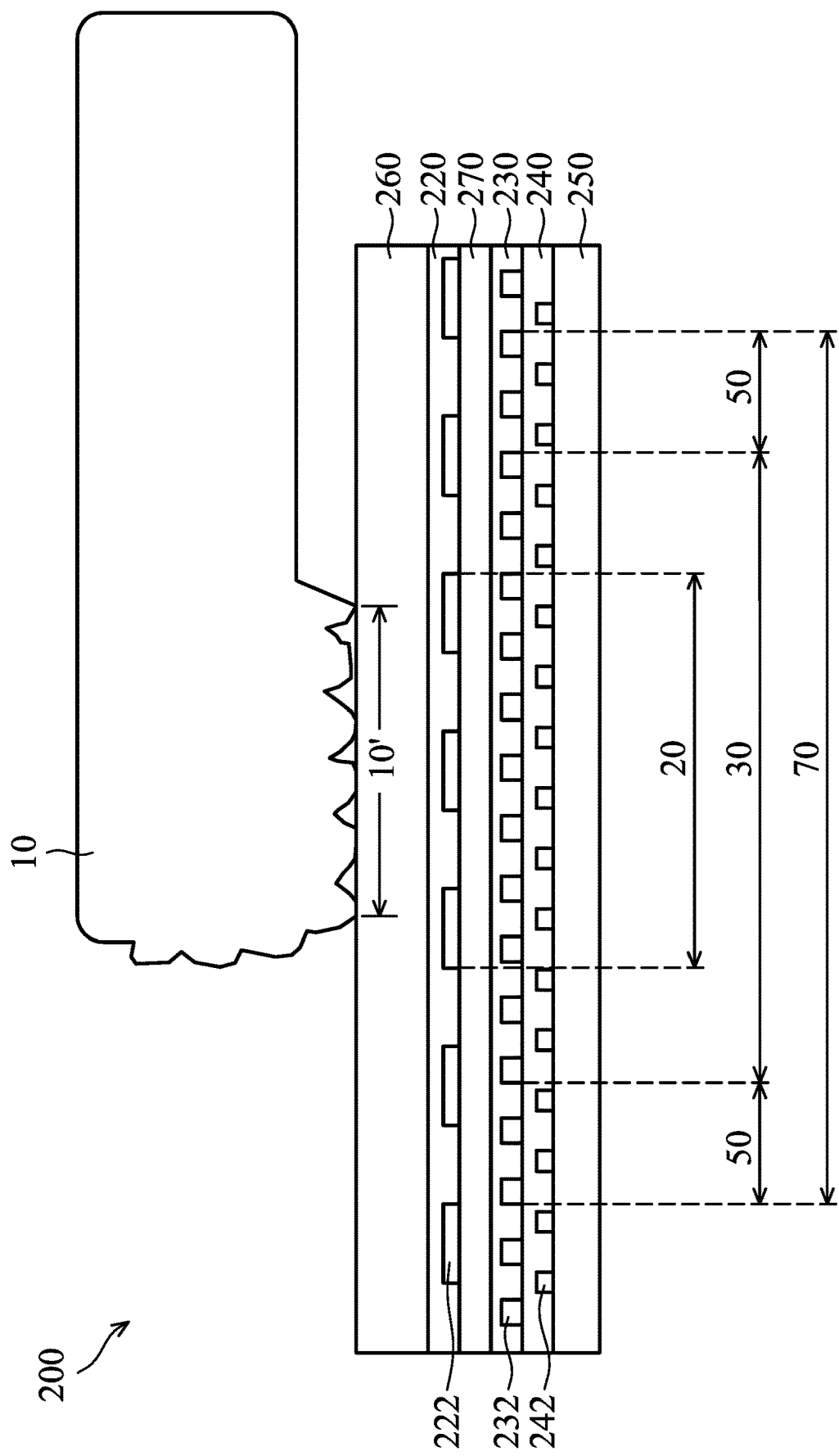
FIG. 9 illustrates a cross-sectional view of one of the stages for an electronic device to receive fingerprint data in accordance with some embodiments of the present disclosure.

As shown in FIG. 9, after the first region 30 is determined, the main controller 210 will define a second region 50 according to the first region 30. After the second region 50 is determined, the step 110', turning off the blue pixel 232B in the first region 30 and in the second region 50, will be performed. As shown in FIG. 9, the second region 50 may be adjacent to the first region 30.

In some embodiment, the red pixels 232R, the green pixels 232G, the blue pixels 232B in the second region 50 may be turned off in the step 110'. In other embodiments, when the display unit 230 includes the red pixels 232R, the green pixels 232G, the blue pixels 232B and the infrared pixels 232IR, the infrared pixels 232IR in the first region 30 are turned on during the step 110'. The infrared pixels 232IR in the second region 50 may not be turned on during the step 110'. In this embodiment, the difference between the first region 30 and the second region 50 is that the display unit 230 in the first region 30 should emit light used as a light source, and whether the display unit 230 in the second region 50 emits light or not may depend on the requirements. In some embodiments, when the electronic device 200 includes the infrared light source 280, whether the display unit 230 in the first region 30 and/or second region 50 emits light or not may depend on the requirements.

Figure 10:
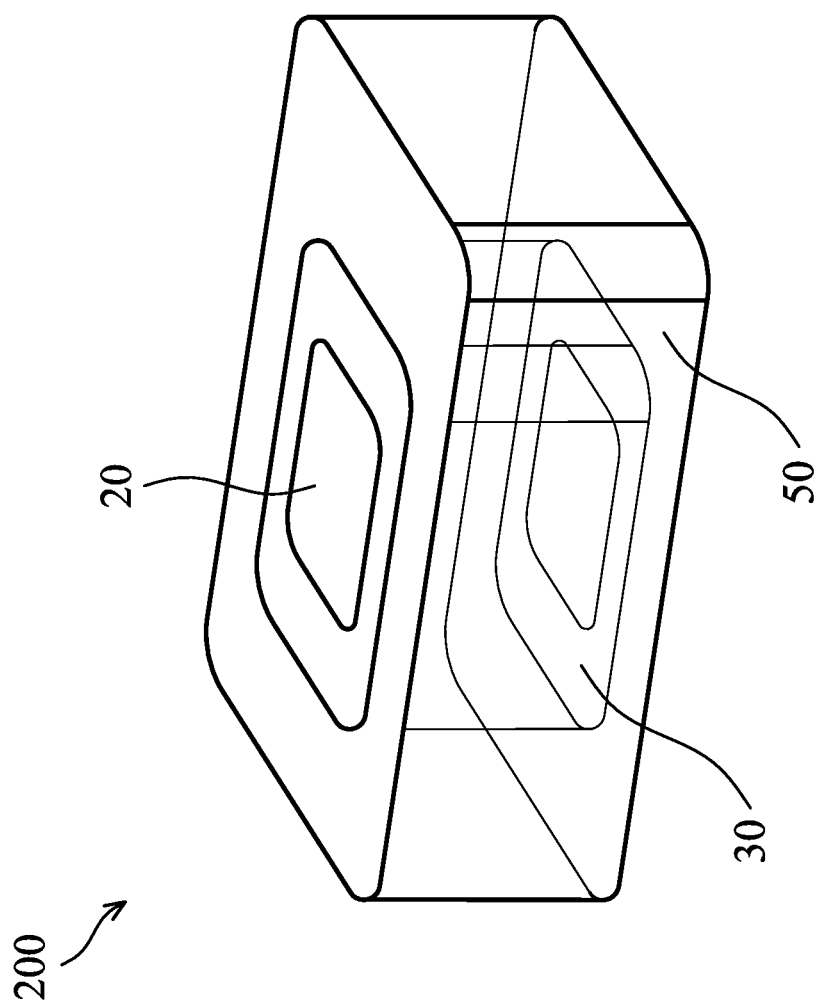
FIG. 10 illustrates a three-dimensional view of the electronic device in accordance with some embodiments of the present disclosure.

Refer to FIG. 10, which illustrates a three-dimensional view of the electronic device 200 in the step of determining the second region 50 in accordance with some embodiments of the present disclosure. In some embodiments, the second region 50 may be adjacent to the first region 30. Since more blue pixels (e.g. the blue pixels in the second region 50) are turned off, less blue light would be incident or scattered to the sensing unit 240, and thereby improving the signal-to-noise ratio or the sensitivity of receiving the fingerprint data.

Figure 11B:
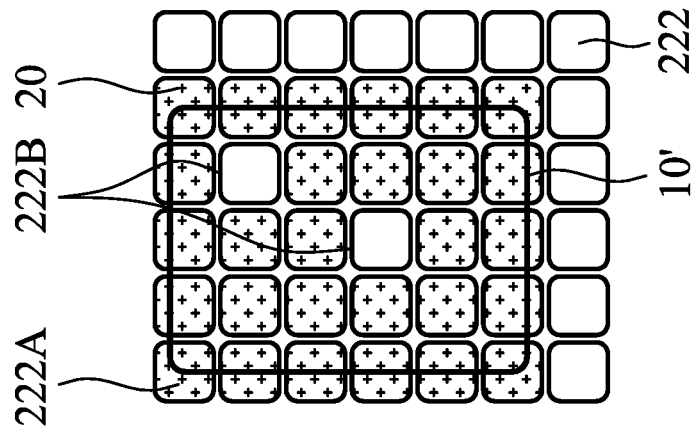
FIGS. 11A and 11B illustrate examples of how a finger touch region is defined in accordance with some embodiments of the present disclosure.
Figure 11A:
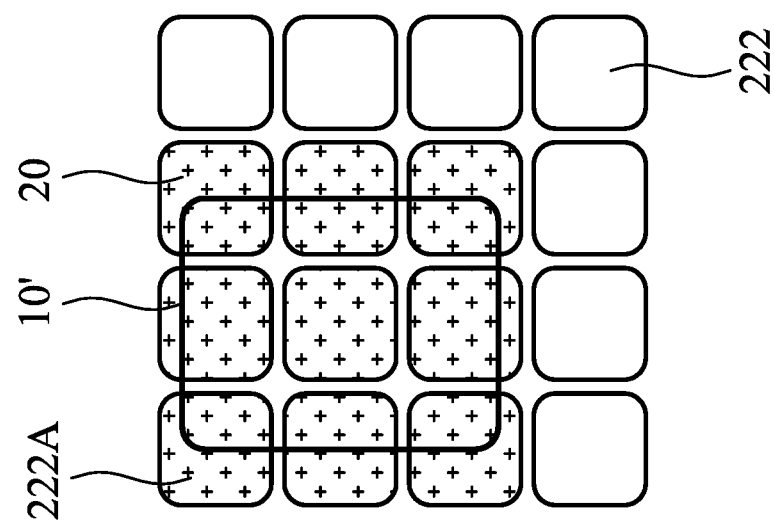

Refer to FIGS. 11A and 11B, which illustrate examples of how the finger touch region 20 is defined in accordance with some embodiments of the present disclosure. As shown in FIG. 11A, when the finger contact region 10' overlaps a 3×3 matrix of the touch pixels 222, these touch pixels 222 may be regarded as activated touch pixels 222A. When the activated touch pixels 222A are determined, the main controller 210 will process the signal from the activated touch pixels 222A, and then compute a region based on the activated touch pixels 222A. Next, the main controller 210 will define the region as the finger touch region 20. For example, when the area of the activated touch pixels 222A is a 3×3 matrix, the finger touch region 20 could be determined as the 3×3 matrix of the activated touch pixels 222A.

In some examples, when the finger contact region 10' overlaps a 6×5 matrix of the touch pixels 222, the 6×5 matrix of the touch pixels 222 would be activated. However, there are some non-activated touch pixels 222B that are not activated due to moisture or dirt as shown in FIG. 11B. In this circumstance, the finger touch region 20 could be determined by using the outermost boundary of the activated touch pixels 222A. For example, if more than 90% of the 6×5 matrix of the touch pixels 222 of the outermost boundary are activated, the finger touch region 20 could be determined as a region of the 6×5 matrix of the touch pixels 222.

Figure 12:
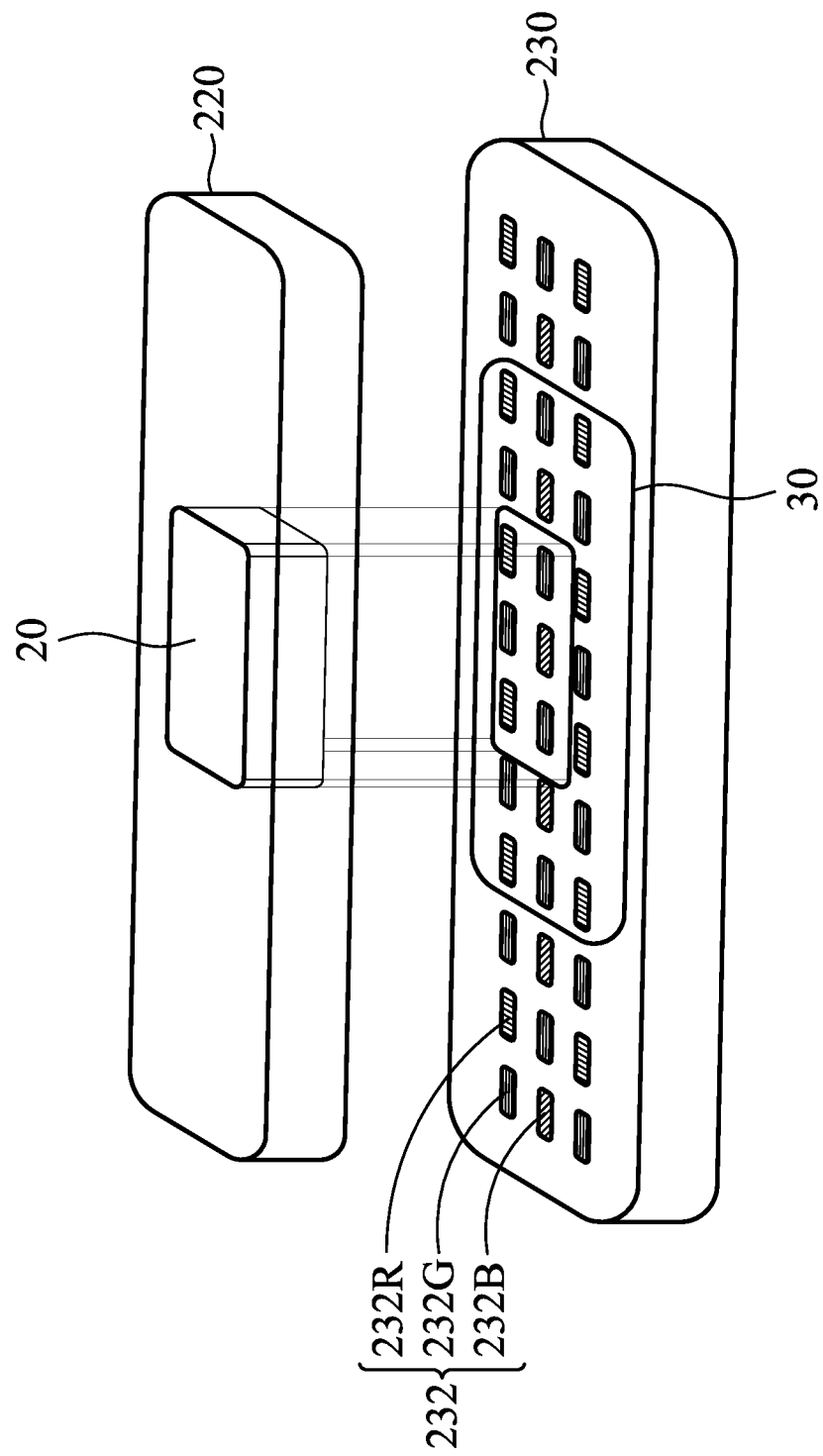
FIG. 12 illustrates an example of how a first region is defined in accordance with some embodiments of the present disclosure.

Refer to FIG. 12, which illustrates an example of how the first region 30 is defined in accordance with some embodiments of the present disclosure. When the finger touch region 20 is determined, the main controller 210 will process the received signal from the finger touch region 20. Next, the main controller 210 determines a region in the display unit 230 in accordance with the finger touch region 20. In some embodiments, the area of the finger touch region 20 projected on the display unit 230 may be substantially the same as the area of the region. The display pixels 232 in the region may overlap the touch pixels 222. The term "overlap" may include "partially overlap" and "entirely overlap".

After the region 60 is determined, the first region 30 will be determined according to the region 60. For example, if the area of the region 60 is a M×N matrix, the first region may be defined as, but is not limited to, a (M+X)×(N+X) matrix, wherein 0≤X≤5. In other embodiments, the first region 30 is equal to the region 60 plus one or more number of adjacent surrounding display pixels 232 of the display unit 230. If the area of the region 60 is a M×N matrix, the first region 30 may be defined as, but is not limited to, a (M+X)×(N+X) matrix, wherein 1≤X≤5.

The second region 50 may be defined in a similar way. For example, the second region 50 is equal to the first region 30 plus one or more number Y of adjacent surrounding display pixels 232 of the display unit 230. The number Y may be in a range from 1 to 5 (1≤Y≤5) but it is not limited thereto.

The step of determining finger touch region 20, the first region 30, the sensing region 40 and/or the second region 50 by the main controller 210 mentioned may include additional steps. The scope of the disclosure is not intended to be limited.

Figure 13:
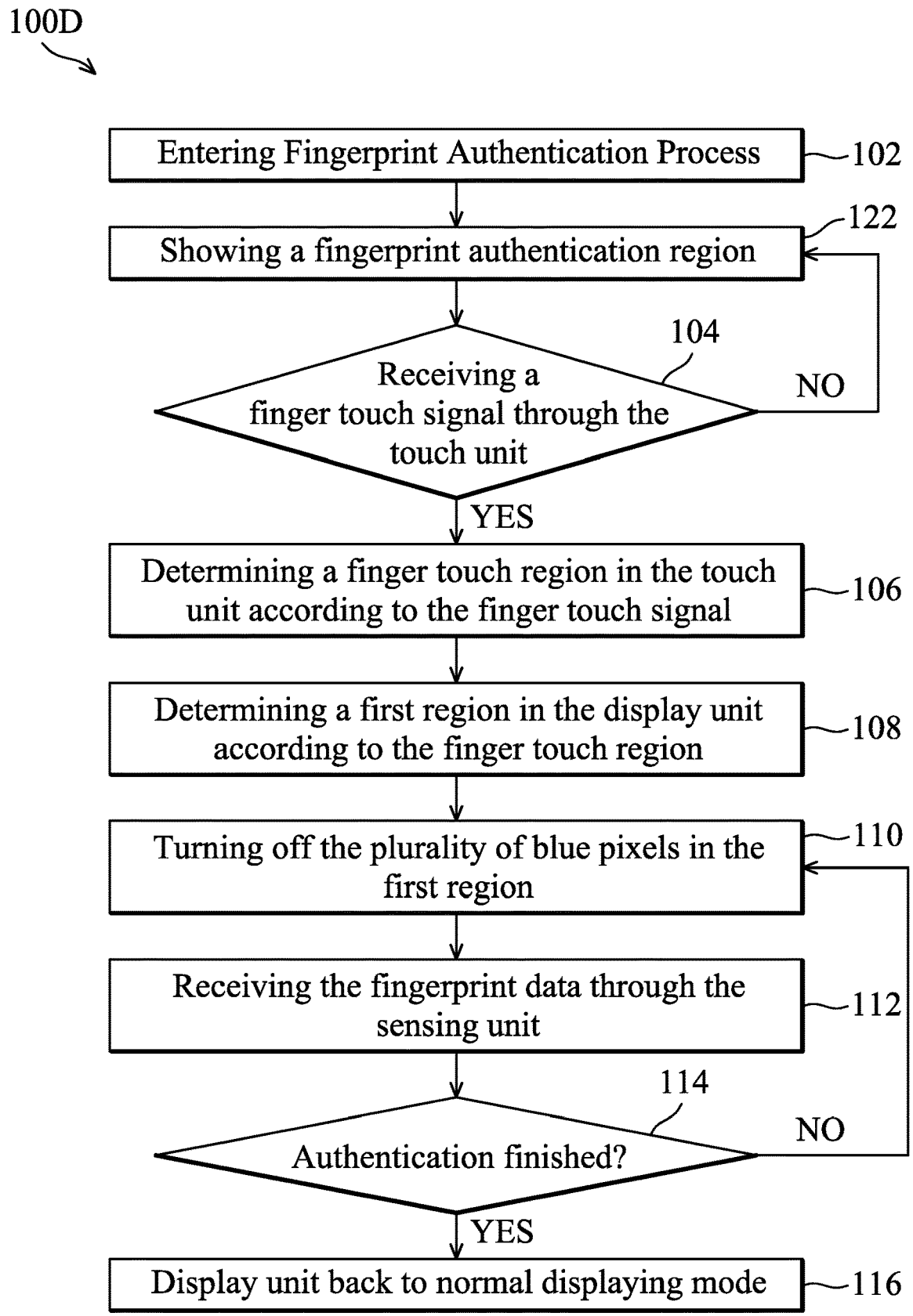
FIG. 13 illustrates a flow chart for an electronic device to receive fingerprint data in accordance with some embodiments of the present disclosure.

Refer to FIG. 13, which illustrates a flow chart of a method 100D for an electronic device 200 to receive fingerprint data in accordance with some embodiments of the present disclosure. In some embodiments, one of the differences between the method 100A and the method 100D is that the method 100D further includes step 122, showing a fingerprint authentication region 70. The step 122 may be performed after entering the fingerprint authentication process and before receiving a finger touch signal through the touch unit 220.

Figure 14A:
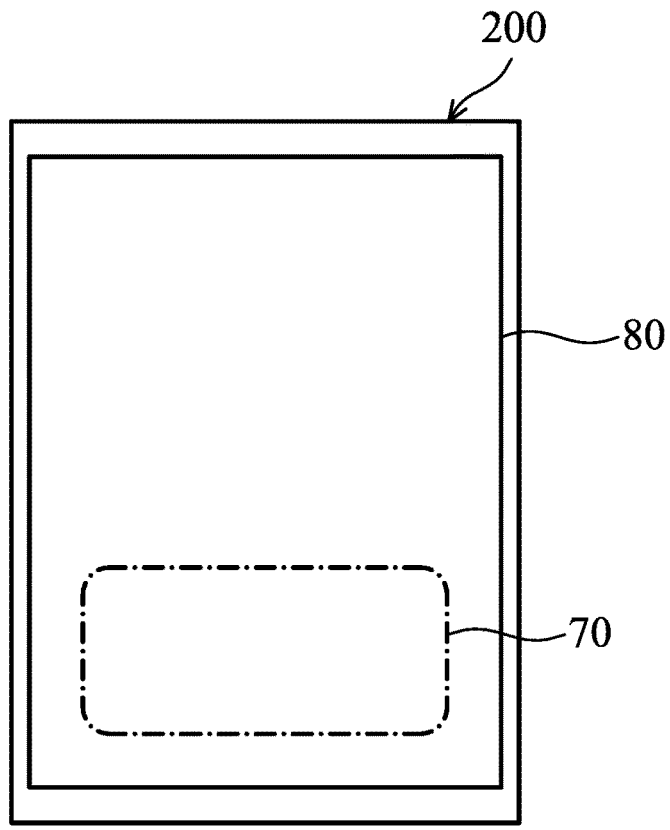
FIGS. 14A and 14B illustrate top views of the electronic device in accordance with some embodiments of the present disclosure.
Figure 14B:
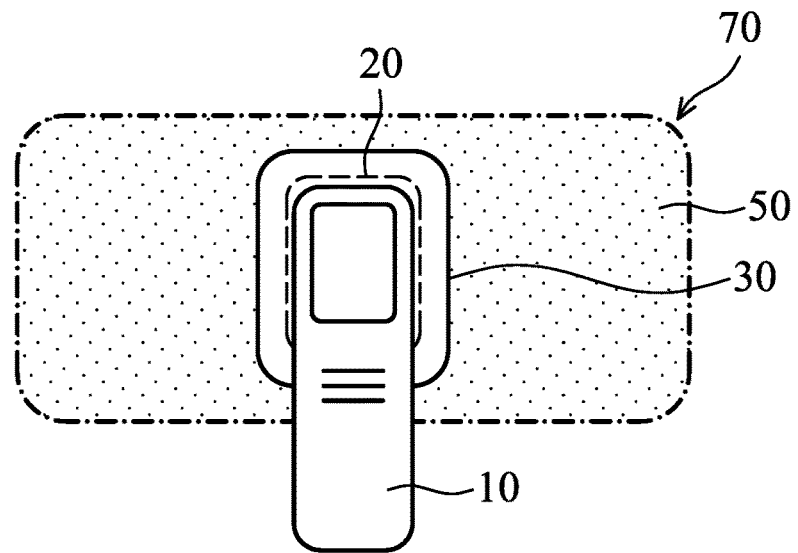

Refer to FIGS. 14A and 14B, which illustrate top views of the electronic device 200 in accordance with some embodiments of the present disclosure. In some embodiments, the electronic device 200 may display the fingerprint authentication region 70, which is used as a region indicating the finger 10 to touch during the fingerprint authentication process. As shown in FIG. 14B, after the finger 10 touches the fingerprint authentication region 70, the first region 30 is defined. In this embodiment, the region, out of the first region 30 and within the fingerprint authentication region 70, may be defined as the second region 50. In other embodiments, there may be at least one region disposed between the boundary of the second region 50 and the fingerprint authentication region 70. In this embodiment, the IR pixels 232IR may be disposed within the fingerprint authentication region 70.

In some embodiments, there is no fingerprint authentication region 70. In this embodiment, the whole active region 80 of the electronic device 200 may be used as the fingerprint authentication region. However, the scope of the disclosure is not intended to be limited.

Although some embodiments of the present disclosure and their advantages have been described in detail, it should be understood that various changes, substitutions and alterations can be made herein without departing from the spirit and scope of the disclosure as defined by the appended claims. For example, it will be readily understood by those skilled in the art that many of the features, functions, processes, and materials described herein may be varied while remaining within the scope of the present disclosure. Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. An electronic device, comprising:
   a lighting unit comprising a plurality of lighting sub-units, wherein the lighting unit has a first region;
   a first unit receiving a first signal and comprising a plurality of first sub-units, wherein the first unit has a second region overlapped the first region; and
   a second unit receiving a second signal different from the first signal and comprising a plurality of second sub-units, wherein the second unit has a third region overlapped with the second region and the lighting unit is disposed between the first unit and the second unit,
   wherein a density of a part of the plurality of the first sub-units in the second region is less than a density of a part of the plurality of the second sub-units in the third region, and a density of a part of the plurality of lighting sub-units in the first region is less than the density of the part of the plurality of second sub-units in the third region.

2. The device according to claim 1, wherein the lighting unit further has a fourth region adjacent to the first region, and a density of a part of the plurality of lighting sub-units in the fourth region is less than the density of the part of the plurality of second sub-units in the third region.

3. The device according to claim 2, wherein the density of the part of the plurality of lighting sub-units in the fourth region is greater than the density of the part of the plurality of first sub-units in the second region.

4. The device according to claim 2, wherein the lighting unit shows a fingerprint authentication region corresponding to the first region and the fourth region.

5. The device according to claim 1, wherein the lighting sub-units comprises light-emitting diodes or organic light-emitting diodes.

6. The device according to claim 1, wherein one of the plurality of lighting sub-units emitting a first light, another one of the plurality of lighting sub-units emitting a second light, and a range of wavelength of the first light is different from a range of wavelength of the second light.

7. The device according to claim 1, wherein an area of the first region is greater than or equal to an area of the second region.

8. The device according to claim 1, wherein an area of the third region is greater than or equal to an area of the second region.

9. The device according to claim 1, wherein an area of the third region is smaller than or equal to an area of the first region.

10. The device according to claim 1, wherein the device comprises an active region, and the first region, the second region, and the third region are located in the active region.

* * * * *